United States Patent
Roelens

(10) Patent No.: US 7,639,924 B2
(45) Date of Patent: Dec. 29, 2009

(54) AUDIO/VIDEO DECODING PROCESS AND DEVICE, AND VIDEO DRIVER CIRCUIT AND DECODER BOX INCORPORATING THE SAME

(75) Inventor: Frederic Roelens, Paris (FR)

(73) Assignee: STMicroelectronics SA, Montrouge (FR)

( * ) Notice: Subject to any disclaimer, the term of this patent is extended or adjusted under 35 U.S.C. 154(b) by 932 days.

(21) Appl. No.: 10/741,812

(22) Filed: Dec. 19, 2003

(65) Prior Publication Data

US 2005/0015794 A1    Jan. 20, 2005

(30) Foreign Application Priority Data

Dec. 20, 2002    (FR) ................................. 02 16326

(51) Int. Cl.
H04N 7/00    (2006.01)
(52) U.S. Cl. ....................................................... 386/95
(58) Field of Classification Search ................... 386/68, 386/65, 69, 125–126, 124, 111, 95
See application file for complete search history.

(56) References Cited

U.S. PATENT DOCUMENTS

| | | | |
|---|---|---|---|
| 5,343,250 A | | 8/1994 | Iwamura |
| 5,502,573 A * | | 3/1996 | Fujinami ..................... 386/65 |
| 5,717,855 A * | | 2/1998 | Norman et al. ............. 709/250 |
| 6,297,797 B1 * | | 10/2001 | Takeuchi et al. ............ 345/467 |
| 7,206,496 B2 * | | 4/2007 | Morohoshi et al. ............ 386/68 |
| 2002/0041756 A1 * | | 4/2002 | Kato ........................... 386/69 |

FOREIGN PATENT DOCUMENTS

EP    0 566 092 A2    10/1993

OTHER PUBLICATIONS

Preliminary Search Report for French Application No. 0216326 dated Oct. 2, 2003.

* cited by examiner

*Primary Examiner*—Thai Tran
*Assistant Examiner*—Tat Chio
(74) *Attorney, Agent, or Firm*—Lisa K. Jorgenson; Stephen Bongini; Fleit Gibbons Gutman Bongini & Bianco P.L.

(57) ABSTRACT

A method and device are provided for decoding one or more audio data streams and one or more video data streams obtained from one or more sources. According to the method, portions of the audio data stream and portions of the video data stream are loaded into a set of buffer memories, and audio data and video data are supplied from the buffer memories at the input of at least one audio decoder and of at least one video decoder, respectively. The video data and the audio data are decoded with the aid of the audio decoder and of the video decoder, respectively. The loading is carried out by a management module according to the Pull mode. Alternately or additionally, the supplying is carried out by the management module according to the Push mode. The management module is regulated by the video decoder.

24 Claims, 4 Drawing Sheets

AUDIO/VIDEO DECODING PROCESS AND DEVICE, AND VIDEO DRIVER CIRCUIT AND DECODER BOX INCORPORATING THE SAME

CROSS-REFERENCE TO RELATED APPLICATIONS

This application is based upon and claims priority from French Patent Application No. 02-16326, filed Dec. 20, 2002, the entire disclosure of which is herein incorporated by reference.

BACKGROUND OF THE PRESENT INVENTION

The present invention pertains to video driver circuits, that is circuits carrying out the decoding and displaying of audio-visual programs coded in the form of a stream of digital data coded according to a given compression standard.

It finds applications in video decoders comprising a personal digital recording functionality (or PVR, standing for "Personal Video Recorder"). In such decoders, a recording of programs is made on a mass storage digital medium (or DSM, standing for "Digital Storage Media") such as a hard disk, a digital video cassette, a DVD ("Digital Versatile Disk"), etc.

The decoders concerned are in particular decoder boxes ("Set-Top Boxes") providing for the interface between an inlet for digital signals broadcast in real time by satellite, by cable or by terrestrial digital broadcasting (or DVB, standing for "Digital Video Broadcasting") on the one hand, and an analog television on the other hand. Such a decoder box is a standalone apparatus. However, the present invention applies also to integrated decoders built into a digital television, or to a digital read/record apparatus such as a DVD reader, a digital video cassette reader or the like.

A decoder box receives one or more programs in the form of a stream of compressed digital data, that is whose video frames (i.e., images) and audio frames are coded in such a way as to reduce the volume of the data broadcast. For example, this coding can comply with the specifications of the MPEG-2 standard (ISO/IEC 13818-2) hereinafter the MPEG standard ("Motion Pictures Expert Group"). This standard defines a data compression technique for the coding of moving pictures and sound (in particular for digital television). According to the vocabulary of the MPEG standard, the compressed digital data stream is called the transport stream. This stream contains packetized audio data and packetized video data.

In the present description, the term "presentation", when it is used in relation to a program, denotes the restoring of the decoded audio and video data, in audible and visible form respectively by a user. The term "playback" (or "reading"), used in relation to a program, more specifically denotes the decoding and the displaying of the program from a recording of the program on a hard disk. The term "display" is more particularly used to designate the presentation of the video frames, whereas the verb "to play" is more particularly used to designate the act of presenting audio frames.

The diagram of FIG. 1 illustrates the principle of the decoding implemented in the early generations of decoder boxes, which did not incorporate the PVR functionality. A demultiplexer 71 receives one or more transport streams, transmitted in real time via a specified transmission channel (satellite, cable, DVB). It carries out the demultiplexing (and possibly the descrambling) of this stream, and delivers a stream of audio data packets and a stream of video data packets. The stream of audio data packets is transmitted to an audio decoder 72 for audio decoding, whereas the stream of video data packets is transmitted to a video decoder 72 for video decoding. Stated otherwise, the demultiplexer plays the role of source of the data to be decoded.

The diagram of FIG. 2, in which the same elements as in FIG. 1 bear the same reference characters, illustrates a principle of decoding implemented in conventional decoder boxes which offer the PVR functionality. The streams of audio data packets and of video data packets delivered by the demultiplexer 71 are stored on a mass storage digital medium 74 such as a hard disk. Then, from the hard disk 74, they can be supplied as input to the audio decoder 72 and to the video decoder 73, respectively, for decoding. In this case, a chapter of the MPEG standard recommends that the hard disk be made to play the role of source of the data to be decoded.

For the new generations of decoder boxes, the hard disk makes it possible to offer a number of functionalities, such as the following.

The decoding and the presentation of a program broadcast in real time and the simultaneous recording on the hard disk of another program broadcast in real time, both contained in one or more transport streams received by the decoder box.

The recording of a program broadcast in real time on pressing the "Pause" button in the course of presentation, then the resumption without interruption of the presentation with a Time Shift, by reading the program from the hard disk, on pressing the "Read" button.

The loading of scrambled programs according to the so-called push model (or "Push mode") which are rendered accessible only after, for example, the acknowledgement by the user of the corresponding access rights (for video on demand).

The implementing of advanced modes of reading (or "trick modes"), that is to say reading at a speed different from a nominal forward speed (x1), in particular fast forward and rewind at high speed or otherwise.

The processing of a transport stream essentially comprises two tasks: the preparation of the data to be decoded and their supplying to an MPEG decoder; and the decoding and the presentation of the images and of the audio, which are carried out by the MPEG decoder.

The MPEG standard was designed by postulating that it is the data source which defines the regulating of the processing and supplies the reference clock. For the displaying of programs broadcast live, this regulating is thus imposed on the MPEG decoder by the demultiplexer which carries out the demultiplexing of the transport stream. The flow of images is present in the stream of video data packets in an appropriate order for real-time decoding and display at nominal speed. The temporal reference system is then based on the Program Clock References (or PCR) present in the transport stream. Presentation Time Stamps (PTS) also present in the transport stream, moreover allow the synchronization of the streams of audio frames and of video frames. The priority for the decoding procedure is to guarantee that the real-time constraints are complied with, and that no hardware resource (for example a queue or a buffer memory) is in a capacity overflow situation.

In the case of the reading of a program from the hard disk, it follows from the aforesaid recommendation of the MPEG standard that it is the reading of the data from the hard disk which must regulate the processing of the data to be decoded. However, the data may arrive at a variable speed, as a function of the accesses to the hard disk which are carried out, these accesses possibly being performed in Burst Mode. Stated otherwise, the concept of real time is lost. On the other hand, one observes that the hard disk itself constitutes a buffer memory which can compensate for the capacity overflow situations.

Furthermore, it may be desirable to be able to carry out the decoding in parallel of several streams corresponding to several respective programs (so-called "multidecoding" functionality), even with a single MPEG decoder. In particular, it allows the transition from real-time presentation to reading from hard disk without time loss due to reinitialization of the MPEG decoder (which may take several seconds). More generally, this allows the end-to-end abutting of two program sequences without artifact, in particular the smooth insertion of prerecorded or other advertising slots into a program (the so-called "Seamless Splicing" functionality).

In certain cases, it is also desirable to be able to use several MPEG decoders for the decoding and the displaying of several programs simultaneously, and/or for the displaying of a program at the same time as the displaying of a still image.

Finally, the implementation of advanced modes of reading is penalized by the real-time aspects which constrain the decoding according to the aforesaid recommendation of the MPEG standard.

SUMMARY OF THE INVENTION

It is an objective of the present invention to provide a decoding principle that makes it possible to alleviate the drawbacks described above, and/or to attain all or some of the aforesaid goals.

A first aspect of the present invention is to provide a method for decoding one or more audio data streams and one or more video data streams obtained from one or more respective sources of data coded according to a data compression standard, such as the MPEG standard. In one embodiment, the method includes the steps of loading portions of the audio data stream and portions of the video data stream into a set of buffer memories; supplying, from the buffer memories, audio data and video data at the input of at least one audio decoder and of at least one video decoder, respectively; and decoding the video data and the audio data with the aid of the audio decoder and of the video decoder, respectively.

The portions of audio data stream and the portions of video data stream which are loaded into the buffer memories are preferably portions of packetized data streams, and/or portions of plaintext (that is descrambled) data streams.

The Pre-Buffering resulting from the passage of the streams through the buffer memories between the source or sources of the data to be decoded (which are the demultiplexer and/or the hard disk) and the data consumers (that is the audio decoder or decoders, and the video decoder or decoders), makes it possible to break with the processing procedure as implemented in the conventional video driver circuits. It thus makes it possible to aftain the goals of the present invention, in a manner which will become apparent on reading the detailed description which follows.

The loading of the buffer memories according to the Pull mode avoids the risk of overflow of capacity of the buffer memories. The unloading of the buffer memories according to the Push mode ensures data supply at the input of the decoders. The fact of regulating the management of the buffer memories by the video decoder allows to efficient regulation of the flows of data to be decoded, which is particularly advantageous in hard disk read mode.

A second aspect of the present invention relates to a device for decoding one or more audio data streams and one or more video data streams obtained from one or more respective sources of data coded according to a data compression standard, such as the MPEG standard. In one embodiment, the device includes a set of buffer memories, at least one source of audio data and of video data, at least one audio decoder and at least one video decoder, and a management module implementing a method according to the first aspect.

A third aspect of the present invention relates to a video driver circuit comprising a device according to the second aspect.

Finally, a fourth aspect of the present invention relates to a decoder box comprising a circuit according to the third aspect.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 3:
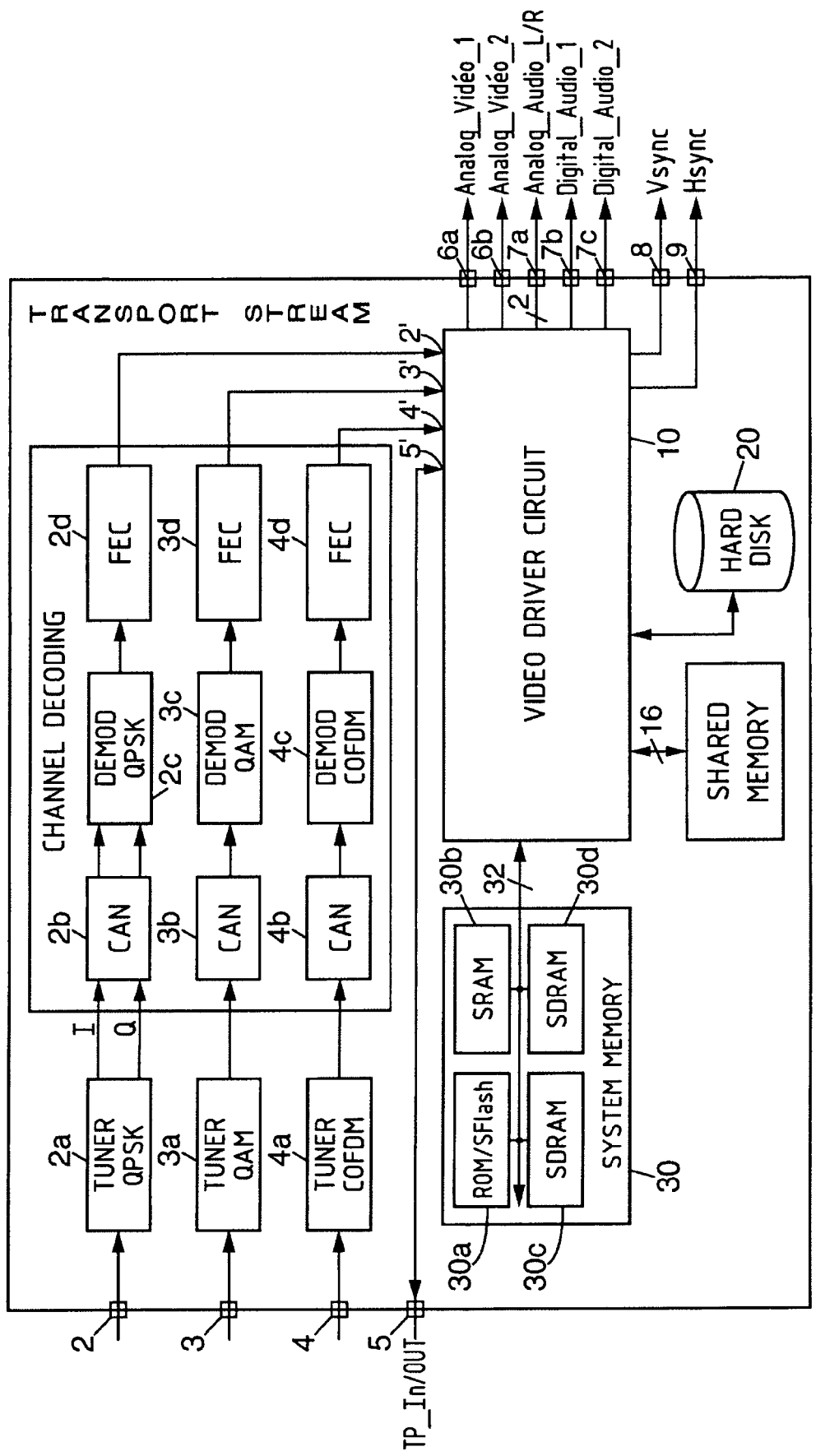
FIG. 3 is a simplified diagram of an exemplary decoder box incorporating a circuit according to one embodiment of the present invention.

FIG. 3 is a block diagram of a decoder box 1 incorporating a video driver circuit according to one embodiment of the present invention. The box 1 comprises, in this embodiment, inputs such as 2, 3 and 4, an input/output 5, and outputs such as 6a, 6b, 7a, 7b, 7c, 8 and 9.

The input 2 is intended to be connected to a parabolic antenna for the reception of a satellite television digital signal. The input 3 is intended to be linked to an optical fiber for receiving a cable television digital signal. The input 4 is intended to be linked to an antenna for receiving a terrestrial broadcast television digital signal (DVB). Finally, the input/output 5 is intended to receive or deliver a stream of (audio or video) transport packets respectively TP_In or TP_Out originating from another appliance, for example a DVD reader, or destined for another appliance, respectively.

The output 6a delivers a video analog signal Video_Out, which is a signal coded in the RGB, YUV, Y/C (S-video signal), or in the CVBS ("Composite Video Baseband Signal") format, and is intended to be linked to a video input of a television. The output 6b for its part delivers an equivalent signal which is for example a CVBS or Y/C signal.

The output 7a delivers audio analog signals Audio_Out_L and Audio_Out_R intended to be supplied to audio analog inputs, left and right respectively, of the television. The outputs 7b and 7c deliver audio digital signals, for example coded in the SP_DIF and PCM format, respectively.

Moreover, the outputs 8 and 9 respectively deliver a vertical synchronization signal Vsync and a horizontal synchronization signal Hsync for synchronizing the displaying of the images, and are intended to be linked to corresponding inputs of the television.

To obtain the lowering of the frequency of the digital signals received on the inputs 2, 3 and 4, the decoder box 1 comprises tuners 2a, 3a, and 4a respectively. It also comprises means carrying out the channel decoding of the signals received, which comprise for example, downstream of each of the tuners 2a, 3a and 4a:

an analog/digital converter 2b, 3b and 4b respectively;

a demodulator 2c, 3c and 4c respectively, performing QAM, QPSK and COFDM demodulation respectively; and, an error correcting filter (FEC) 2d, 3d and 4d respectively.

The signals supplied by these channel decoding means are transport streams within the meaning of the MPEG standard. They each contain a multiplex of audiovisual programs, plus miscellaneous data such as subtitles, teletext data, and/or user data comprising information about the weather, the description of the programs, etc.

The decoder box 1 also comprises a digital means of mass storage 20, which in this embodiment is a hard disk. As a variant, this may be a DVD-Rom or a DVD-Ram.

The decoder box 1 further comprises a system memory 30 and a shared memory 31. In one example, the system memory 30 is a 32-bit memory which comprises a ROM/SFlash memory 30a, a peripheral SRAM memory 30b, and two SDRAM memories 30c and 30d respectively. In one example, the shared memory 31 is a 133 MHz (megahertz) 16-bit memory which comprises one or two 16-Mbit (megabits) SDRAM memories or a 64 or 128-Mbit SDRAM memory. Preferably, this memory copes with the 64 and 128-bit configurations.

The decoder box 1 further comprises a video driver circuit 10, which has the function of performing the decoding and the presentation of the images and the audio from the transport streams received, and also the recording of one or more programs on the hard disk 20, and the reading of a program recorded thereon.

For the real-time presentation and for the time-shift reading of a program, the video driver circuit 10 carries out the source decoding, which comprises in particular the functions of demultiplexing/descrambling, MPEG decoding, formatting of the video data into the PAL, SECAM or NTSC format, and formatting of the digital audio data into the analog format. It also carries out the recording and the reading of the data on the hard disk 20.

Figure 4:
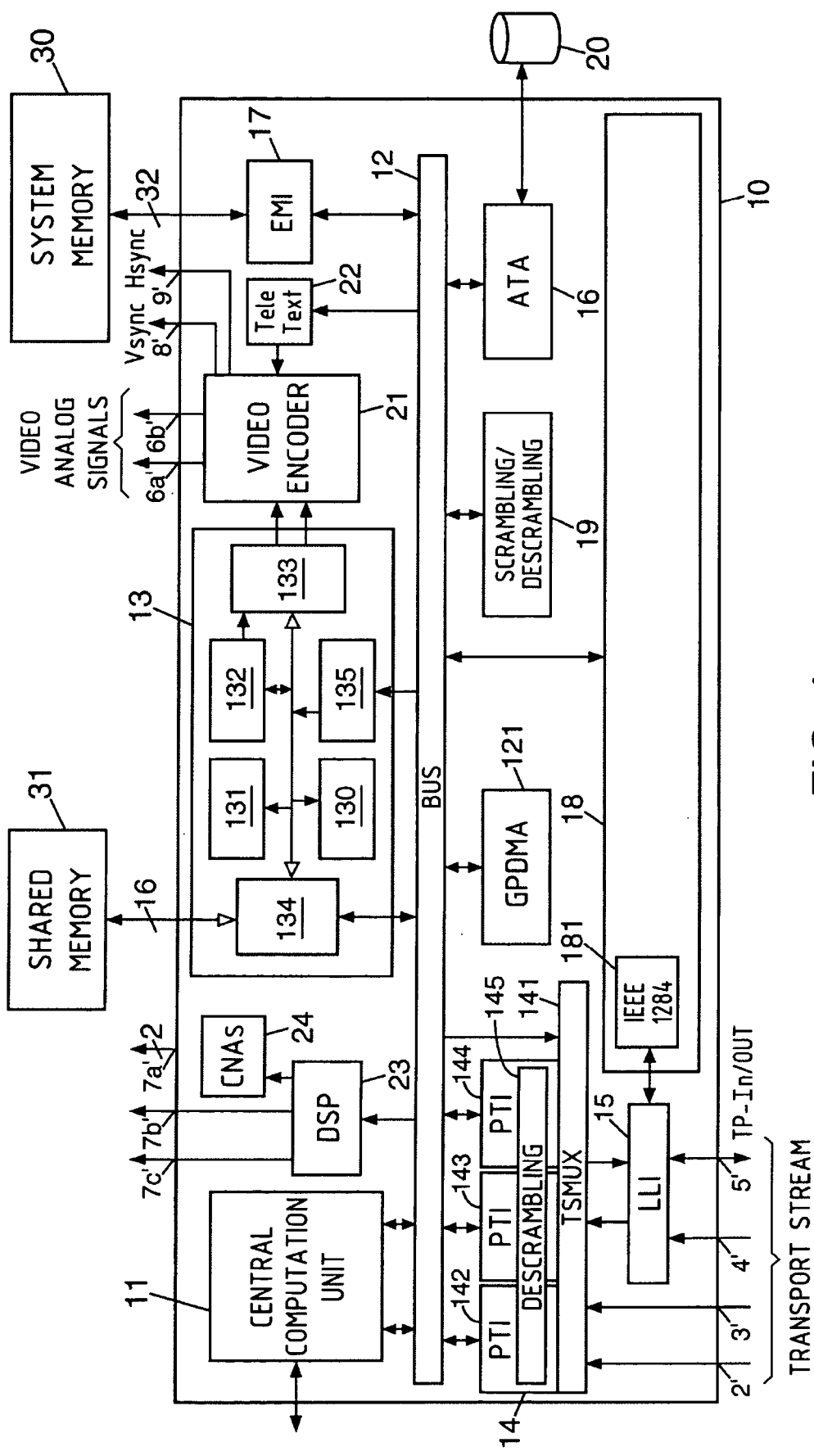
FIG. 4 is a diagram illustrating an exemplary hardware architecture of a circuit according to one embodiment of the present invention.

An exemplary implementation for the hardware architecture of the circuit 10 according to one embodiment of the present invention is detailed in the diagram of FIG. 4.

The circuit 10 comprises a central computation unit 11 which is for example the ST20 circuit from STMicroelectronics. This is a 32-bit RISC processor, clocked at 166 MHz. It comprises a processor core of the ST20C2+type with 8 Kbytes of instructions cache, 8 Kbytes of data cache and 8 Kbytes of on-board SRAM memory.

An interconnection plane 12 (bus) such as the data bus known by the name "STBus" carries out the interconnection of the various elements of the circuit 10 which have to communicate with the unit 11. As a variant, this may be the bus known by the name "SuperHyway", in particular if the unit 11 is based on a microprocessor core of the SH40 type from STMicroelectronics.

The unit 11 is coupled bidirectionally to the bus 12.

Furthermore, a DMA (Direct Memory Access) controller for general use or GPDMA controller (standing for "General Purpose DMA controller") 121 is bidirectionally coupled to the bus 12, so as to control the hardware channels between the various hardware elements of the circuit 10. It is recalled that a DMA is a hardware channel between two hardware or software entities of the circuit.

The circuit 10 also comprises an audio/video decoder 13, for example an MPEG-2 decoder of the MP@ML ("Main Profile at Main Level") type, furnished with advanced modes of display such as fast forward and display in smooth rewind mode.

Figure 1:
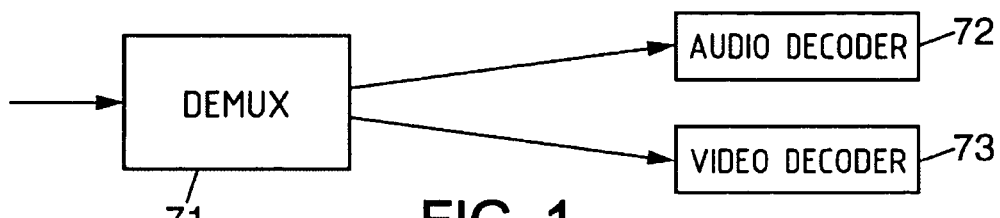
FIG. 1 and FIG. 2 are diagrams which illustrate the principle of the decoding of a stream of audio packets and of a stream of video packets according to the prior art.
Figure 2:
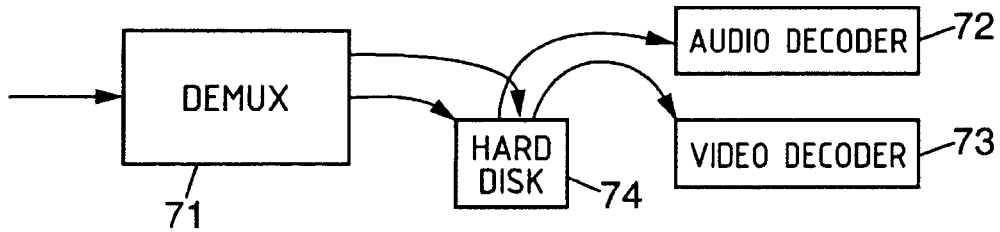
Figure 5:
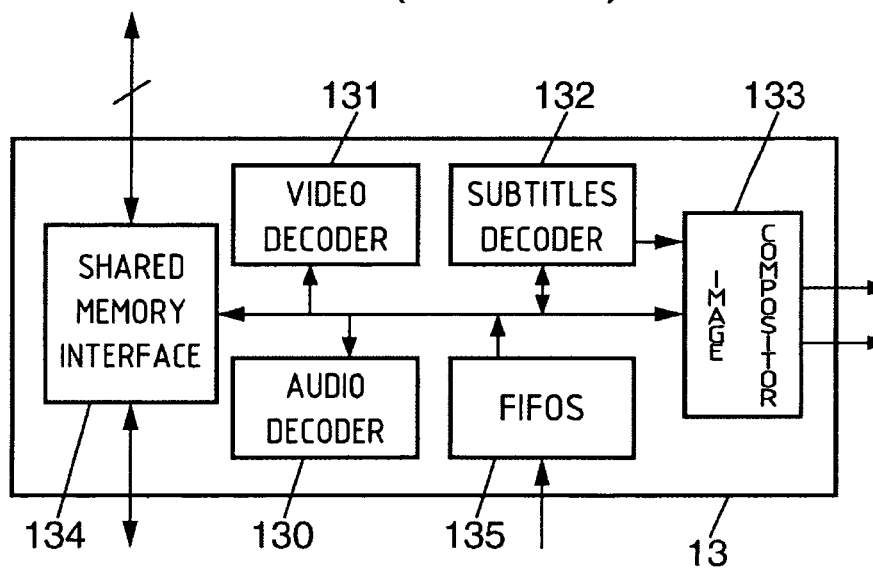
FIG. 5 is a diagram showing the detail of an exemplary audio/video decoder included in the circuit of FIG. 4.

As is detailed by the diagram of FIG. 5, the decoder 13 comprises, linked internally via an ad-hoc interconnection plane:

an audio decoder 130;

a video decoder 131;

a subtitles decoder 132;

a display compositor 133 for managing the insertion of subtitles, having further an image inlay functionality (On-Screen Display or OSD) on 2-8 bits;

a shared memory interface 134 enabling it to communicate with the shared memory 31 of the decoder box; and buffer memories 135 of FIFO (First-In First-Out) type also called CD_UNIT in the MPEG standard.

The interface 134 is bidirectionally coupled to the shared memory 31 which is external, and to the bus 12. The buffer memories 135 are also coupled to the bus 12 to receive the data to be decoded.

Returning to FIG. 4, the circuit 10 also comprises a teletext data decoder 22 linked to the bus 12 to receive the data to be decoded.

The circuit 10 further comprises a video encoder 21 (Display Encoder or DENC) coupled to the audio/video decoder 13. The video decoder 21 has the function of formatting the decompressed video data into the PAL, SECAM or NTSC format, as a function of the type of the screen of the television. This is why it is also called the PAL/SECAM/NTSC video encoder. It generates analog video signals RGB, YUV, Y/C, and/or CVBS which are delivered on outputs 6a' and 6b' of the circuit 10. The video encoder 21 also generates the vertical and horizontal synchronization signals synchronizing the displaying of the images, Vsync and Hsync respectively, which are delivered on outputs 8' and 9' respectively of the circuit 10. It is recalled that these signals are intended to be supplied to the television on which the audiovisual program is presented.

The outputs 6a', 6b', 8' and 9' of the circuit 10 are intended to be linked to the outputs, 6a, 6b, 8 and 9 respectively of the circuit 1 (see FIG. 3).

Moreover, the circuit 10 comprises a transport block 14 having a transport stream multiplexer 141 (or TSMUX), Programmable Transport Interfaces (or PTIs), here three such interfaces 142, 143 and 144, as well as a descrambling module 145. The PTIs are bidirectionally coupled to the bus 12. Furthermore, the multiplexer 141 is coupled to the bus 12 to receive the data extracted from the hard disk 20.

The function of the PTIs is to process each one of the transport streams received via inputs 2', 3' and 4' of the circuit 10, or read from the hard disk 20, or else the stream of transport packets TP_In (originating from outside the box 1) received via an input/output 5' of the circuit 10. Advantageously, by having several PTIs (namely three in the embodiment shown) it is possible to simultaneously process several distinct transport streams.

The inputs 2', 3' and 4' and the input/output 5' are intended to be linked, in the box 1, to the inputs 2, 3 and 4 and to the input/output 5, respectively (see FIG. 3).

Each of the PTIs 142, 143 and 144 carries out a processing having several functions. First, it performs the selecting of the data packets of a given program of the processed transport stream (demultiplexing) by generating streams of transport packets each corresponding to a specified program. Also, it carries out the indexing of the stream of transport packets, that is to say the labeling of the events with the number of the packet in which these events occur. The fact that the interface is programmable allows flexible implementation of this indexing, as a function in particular of the manufacturer's requirements regarding conditional access. Thereafter, each PTI directs the audio, video, teletext and subtitles packets to the appropriate decoder. Finally, it carries out the filtering and the acquisition of the broadcast data (tables), in particular the Program Specific Information (or PSI).

In one example, each of the PTIs 142, 143 and 144 supports a bit rate of 120 Mbit/s. This easily allows the processing of a 15-Mbit/s stream with a view to display in fast forward mode at the speed x6 (that is to say six times the nominal speed x1).

The descrambling module 145 caters for the multiple descrambling of the transport streams processed by 1 the PTIs. This descrambling can be carried out according to a DVB, DES or ICAM mode, for example.

Optionally, the transport block 14 communicates with one at least of the inputs 2', 3' and 4' by way of a Low Level Interface 15 (or LLI). The interface 15 also provides interfacing between the transport block 14 and the input/output 5' of the circuit 10 via a parallel/serial interface, so as to receive the aforesaid stream of transport packets TP_In or to deliver the likewise aforesaid stream of transport packets TP_Out.

The circuit 10 also comprises an interface 16 for accesses to the hard disk 20. This is for example an ATA ("AT Attachment") type interface, also known as an ITE, for example an ATA-5 interface. As a variant, this is a UDMA type interface. By virtue of the interface 15, the hard disk can be write- or read-accessed by the central computation unit 11 and by the GPDMA controller 121.

The circuit 10 also comprises an External Memory Interface 17 (or EMI) for communicating with the system memory 30.

It further comprises a set 18 of integrated interfaces for communication with peripherals including, for example, five UARTs, six parallel input/output banks, two interfaces for chip card, four PWM (Pulse Width Modulation) channels, a teletext serializer, a multichannel infrared emitter/receiver, and a front-end analog modem interface (for connection to the internet). An interface 181 of IEEE 1284 type of the set 18 is also coupled to the low-level interface 15 to allow the receiving and sending of the streams TP_In and TP_Out respectively via the parallel/serial interface.

Likewise, an engine 19 for local scrambling/descrambling of the data respectively recorded on/extracted from the hard disk 20 makes it possible to manage security against the pirating of the data stored on the hard disk. In one example, this engine carries out a local scrambling of the data recorded on the hard disk, so as to guarantee the conditional access functionality and prevent pirating.

Finally, the circuit 10 comprises an audio subsystem 23, with a DSP (Digital Signal Processor) 231, for generating audio signals under all current audio formats. This subsystem 23 is linked to outputs 7a', 7b' and 7c' of the circuit 10, via a set 24 of digital/analog converters (CNAs) for the output 7a' (with such a converter for each of the left and right channels).

Thus in one example:

the output 7a' delivers the analog signals Audio_Out_L and Audio_Out_R presented above;

the output 7b' delivers a digital audio signal of a type known by the name PCM (Pulse Code Modulation), namely a form of uncompressed digital audio coding which is used in particular in audio CDs and DVDs; and, the output 7c' delivers a digital audio signal of a type known by the name S/P DIF ("Sony/Philips Digital Interface"), namely a type of digital audio transmission using a coaxial connector.

The outputs 7a', 7b', and 7c' of the circuit 10 are intended to be linked to the outputs 7a, 7b, and 7c respectively of the decoder box 1.

The video driver circuit 10 is, for example, embodied in the form of a system on a chip (or SOC), with the 0.18 micron technology. It may be integrated into a PBGA388 type box.

Figure 6:
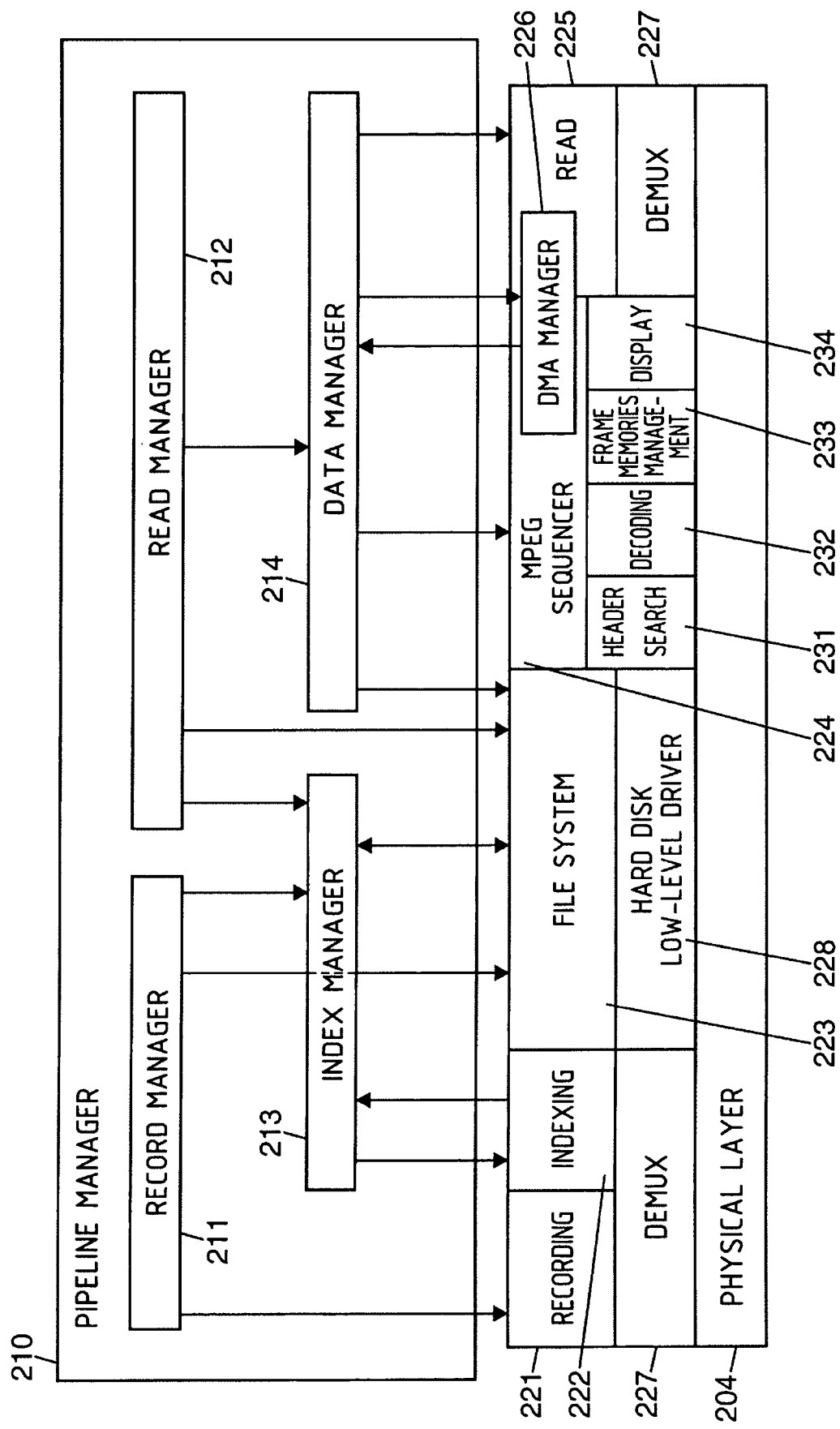
FIG. 6 is a diagram illustrating the exemplary software architecture of the means carrying out the recording and the reading of the programs on the hard disk according to one embodiment of the present invention.

The diagram of FIG. 6 shows an exemplary software architecture of the means of the video driver circuit 10 which cater for recording and reading on the hard disk 20. Conventionally, this architecture is presented according to a layered model.

The lowest layer 204 is a physical layer corresponding to the hardware architecture of the circuit 10, and on which the various software layers are stacked.

The highest layers form what is called a Pipeline Manager 210. The pipeline manager comprises a Record Manager 211, a Read (Playback) Manager 212, an Index Manager 213, and a Data Manager 214.

The lowest layers (beneath the pipeline manager 210 but above the physical layer 204) comprise a record module 221, an index module 222, a file system 223, an MPEG sequencer (MPEG Scheduler) 224, and a read module 225. Moreover, a DMA manager 226 comes above the sequencer 224 and the module 225.

In the figure, the unidirectional or bidirectional data exchanges and/or the commands between the entities of the pipeline manager 210 between themselves or between these entities and those of the lowest layers, are symbolized by vertical arrows.

The modules 221, 222 and 226 call upon a bottom layer 227, the so-called micro-coded architecture demultiplexing layer (or TC code standing for "Transport Controller Code"). Stated otherwise, this is the Driver implementing the function of demultiplexing by a micro-code based programmable circuit.

The file system 223 relies on the low level driver software 228 of the hard disk ("HDD Low Level Driver").

In one exemplary implementation of the present invention, the sequencer 224 relies on four modules carrying out, in a distinct manner, four respective tasks related to the MPEG decoding. This involves a header search module 231, a decoding module 232, a frame memories manager 233 and a display module 234.

The manner of operation of the modules 231 to 234 and 226 will now be described in detail, given that these modules are implemented in the form of software in this embodiment.

Header Search Module 231

Preferably, the programs are stored on the hard disk 20 in the original scrambled form, either at the level of the complete transport stream if all the multiplexed programs are stored together, or at the level of a partial transport stream if the transport stream of a single program is stored. As a variant, the programs are stored in the form of a Packetized Elementary Stream (or PES) comprising the audio, video data packets or data packets of a single program. In all cases, no indexing information such as the location of the images is recorded on the hard disk. The content of the recorded program(s) is therefore better protected against pirating.

Nevertheless, this entails the implementation of a specific mechanism for reading. The function of this mechanism is to analyze (or "parse") the content of the stream recorded on the hard disk so as to determine the location of the images, by detecting the header of the packets included in the stream. This mechanism is implemented by the header search module 231.

An MPEG video stream is composed of MPEG sequences, each composed of groups of pictures (GOP) within the meaning of the MPEG standard. Each GOP is composed of compressed images. Each image is composed of slices. Each slice is itself composed of macroblocks of 16×16 pixels each. Finally, each macroblock comprises six blocks of 8×8 pixels each.

The header search module operates in a manner much like the header search functionality described in the MPEG standard. Its main function is to copy all the information extracted from the header fields of an MPEG sequence into suitable software structures, as far as slice level.

During decoding, the header search module can, in parallel, read elementary video data input into an elementary stream buffer memory of the FIFO type, and, detect a Start Code and signal to the MPEG sequencer that such a code has been detected and that the following data are available in the buffer memory.

The start codes which are detected are:
the start code of an image (code 0x00);
the start code of the first slice of the image (code 0x01); and
all the other start codes apart from those of the other slices of the image (codes 0xB0 to 0xFF).

Stated otherwise, the header search module detects all the start codes other than the slice start codes except for the first slice of an image (codes 0x02 to 0xAF).

The algorithm for the processing implemented by the header search module is very simple. When a start code is detected, this start code is analyzed. Three cases are then distinguished as follows.

Either the start code is a code of the MPEG standard but is not any one of the codes 0x02 to 0xAF: hence, the start code is stored in a suitable software structure, it is signaled that this information has been received and is available, and another start code is searched for;

or the start code is not a code of the MPEG standard: the MPEG sequencer is then signaled that something is not right, and another start code is searched for;

or the start code is one of the codes 0x02 to 0xAF: hence, the MPEG sequencer is signaled that all the information is available to proceed with the decoding of an image (i.e. all the information as far as slice level). It will be noted that, thereafter, another start code is not automatically searched for. Specifically, the onus is on the MPEG sequencer to instruct the search for a next image. This represents the manner of operation of the MPEG sequencer according to the Pull Model (or "Pull mode").

The software structures mentioned above are those described in the MPEG standard, which is herein incorporated by reference and to which the reader is invited to refer for fuller information. A global structure, or header main search structure contains the position of the last start code detected in the stream as well as an ad-hoc flag for signaling that a specific structure has or has not been received.

In addition to this, the header search module comprises:
means for locating the position (i.e. the address) of a start code in an elementary stream buffer memory, with the aid of a 24-bit counter which is reset to zero with each reinitialization of the buffer memories and which indicates the number of bytes of the stream which have been analyzed;

means for detecting that a specified discontinuity has been signaled to the input of the elementary stream buffer memory (for example when switching from one coded data stream source to another, or during an advanced mode of reading);

means for extracting specific user data from an MPEG sequence (which are detected between two specified start codes) and for storing them in a particular buffer memory, the so-called acquisition buffer memory. This acquisition buffer memory is dynamically allotted so as to get round the fact that the size of the user data is not defined in advance. Optionally, this acquisition buffer memory may be a circular memory, for compatibility with the other modules; and, means for defining the type of image to be decoded and displayed, in a given protocol (called display protocol). These means are not indispensable, but they facilitate and define appropriately the manner in which an image is to be decoded, synchronized and displayed. The expression type of images is understood for example to mean, in particular, the fact that an image is progressive or otherwise, the number of fields which have to be displayed per image, the polarity of the fields (up to three fields maximum, each field possibly being a Top Field or a Bottom Field), the number of valid reframing vectors ("Pan and Scan Vectors") contained in the frame (up to four maximum), and the manner in which the reframing vectors are received and are to be used. Advantageously, the image type is defined by a single parameter, which is an Entry Value in a table which condenses and unifies all the information about the image type.

Decoding Module 232

The main function of this module is to generate each instruction for decoding an image, from header information which has been extracted by the header search module 231.

The module 232 receives calls only from the MPEG manager 224. The following main calls will now be explained:

prepare a decoding instruction, and request the supplying by the frame memories manager 233 of the address of a frame memory in which to store the image to be reconstructed, as well as the address of the frame memory or memories where the reference images required for this reconstruction is (are) stored;

store an instruction;
skip an image;
reinitialize the decoder in case of restart or in case of fatal decoding error; and
locate and verify the position of the decoder, as well as the end of the data in the elementary stream buffer memory.

Concerning the preparation of the decoding instruction, specified parameters are extracted from the header fields of the packets of the data stream and are formatted according to the Register Map of the decoder. This involves in particular the type of the stream, namely MPEG-1 or MPEG-2, horizontal and vertical image parameters, the image coding type, the width and the height of the image in macro blocks, etc.

To decode an image, frame memories are necessary, namely a minimum of a reconstruction buffer memory, a forward buffer memory and a backward buffer memory (for type P predicted images). It is at this juncture that the decoding module allots the image to be decoded to the frame memory manager 233. As the decoding has not yet begun, the manager 233 marks the reconstruction buffer memory as latched and does not consider the image to be available until the decoding has terminated. If an error occurs during decoding, the manager 232 might not take account of the image insofar as no other procedure can use it. The decoding module 233 is certain of obtaining a frame memory when it requests one from the manager 233. Specifically, the MPEG sequencer 224 ensures that there is at least one frame memory which is free or marked as such in the manager 233, before preparing the decoding instruction.

Likewise, the function of the decoding module 232 is to verify that the internal RAM memory contains the right quantization tables. In the MPEG data streams, three different types of quantization table can be used: the default tables, which are not defined in the stream; the tables defined in the sequence; and the specific tables for each image. If the right tables are not available, the module 232 demands the reloading of the tables by setting up a flag to this effect, as well as a pointer to the ad-hoc structure: the default tables, the table in the Sequence Extension or the table in the Picture Extension.

Concerning the locating of the position of the decoding module inside the elementary stream buffer memory, it will be noted that the procedure implemented is similar to that described for the header search module 231, except that only the position of the last data item in the video elementary stream buffer memory is given. Since there is another counter which indicates the size of the video elementary stream buffer memory, it is thus possible to obtain a good estimate of the position of the decoding module.

Concerning the instruction storage, it shall be noted that all the parameters required are stored at the same time when the MPEG sequencer 224 requests that the decoding procedure start. When this storage has terminated, the decoding task proper is started immediately, without waiting for a vertical synchronization event. It should be noted that it is then that a new header search is started automatically, which mainly explains that the header search module 231 is not restarted when a new portion of audio or video data stream is received in the elementary stream buffer memory.

Moreover, before commencing the decoding proper, the position of the decoding module is used, on the one hand to verify that the decoding module and the information obtained from the header search module 231 are in phase with the image that the decoding module will decode, and on the other hand, to locate the position of the image approximately, and to associate it with the frame (which may be used to commence decoding in rewind mode, if the data are still available in the buffer memory).

With regard now to the skipping of an image, it will be noted that when the MPEG sequencer 224 demands the skipping of an image, this action is immediate and that a header search is instigated at the same time so as to maintain the synchronization of the two modules 231 and 232.

Finally, concerning the reinitialization of the decoding module 232, it will be noted that, in case of reinitialization (complete or partial), all the pointers for position in the video elementary stream buffer memory are reinitialized at the same time. Moreover, all the memory registers are left as such and therefore retain the same content as before. This is not a problem insofar as they are all instructed when necessary. No edge effect has been noted in practice.

Frame Memories Manager 233

The function of this module is to manage frame memories used for the decoding of the images. When the images of the stream comprise images of type I (intra coded images), of type P (predicted images) and of type B (bidirectional predicted images), it is thus necessary to provide a minimum of four frame memories:

one to store the image already decoded and which is currently being displayed;

two others to store the two reference images (Predictors) necessary, at most, to reconstruct the image to be decoded; and the last to store the image to be decoded, currently being reconstructed.

The frame memories manager 233 also has the function of managing the order of display of the images, as a function of the direction of display (forward or backward). To this effect, it advantageously deploys a virtual time base, rather than using a time base reliant on the presentation time stamps (PTS) associated with the video frames, which would pose great difficulties during reading from the hard disk.

The virtual time base is based on virtual time references respectively associated with each video frame, and assigned when the video frame arrives at the input of the decoder 13. These references are achieved via a number coded for example on 32 bits, whose value is initialized for example to h80000000 (80000000 in hexadecimal notation) on receipt of a read command. This initialization value makes it possible to reference the equivalent of around a year of frames, in both forward and backward mode.

These virtual time references are also used to determine which of the frames out of those stored in the frame memories are the oldest, so as to determine the frame memories which may be overwritten when necessary.

In practice, the frame memories manager 233 is embodied in the form of a table which contains the essential information for decoding and displaying the images. This information is:

the maximum number (for example coded on 8 bits) of frame memories that can be managed by the manager 233;

all the parameters of the image, such as the width of the image, the height of the image, the presence of PTSs, the presence of Pan and Scan vectors, etc., arranged according to a suitable structure;

the identifier (i.e. an address pointer, for example coded on 8 bits) of the frame memory containing the decoded image which is currently being displayed;

the identifier (for example coded on 8 bits) of the frame memory containing the forward reference image, as appropriate (that is for an image to be decoded which is of P type or of B type);

the identifier (for example coded on 8 bits) of the frame memory containing the backward reference image, as appropriate (for an image to be decoded which is of B type);

the identifier (for example coded on 8 bits) of the frame memory intended to contain the image currently being reconstructed;

a virtual time reference (for example coded on 32 bits) associated with the image currently being displayed; and virtual time references (for example coded on 32 bits each) respectively associated with each of the images which may be contained in the frame memories. The number of such virtual time references is therefore equal to the maximum number of frame memories. These references are allocated at the moment of decoding. They allow the display module 234 to know which image to extract from the frame memories so as to display the images in the correct order.

Display Module 234

The function of this module is, essentially, to manage the control of the displaying of the decoded images, by carrying out the necessary conversions between the respective parameters of the decoded images and of the display screen.

The parameters of the images are supplied to the module 234 by the frame memories manager 233. These are in particular the width and the height of the image, the position of the luminance and chrominance buffer memories in the memory, the display protocol, the list of Pan and Scan vectors, the reduced display area defined by the vectors, the aspect ratio of the image (for example 4/3, in the PAL format). A priori, the decoded images are stored in the frame memories as macroblocks in the 4:2:0 format.

The parameters of the display are supplied to the module 234 by the display encoder 21 (FIG. 4), in particular. These parameters comprise in particular the height and width of the screen, the offset of the displayable area of the screen, the aspect ratio of the complete displayable area (for example 16/9), and the time interval between two fields.

However, the module 234 also has the function of managing the interleaving or the de-interleaving of the images. In general, the images of the currently broadcast audiovisual programs are interleaved images.

If the display screen is an interleave screen, and if the reading speed is the nominal speed (×1), there is no need to modify the interleaving of the frames. It is only necessary to verify that the polarity of the frames corresponds to that of the display screen.

However, when the reading speed is different from the nominal speed, and/or when the interleaving of the frames has to be modified because the frames are progressive, it is advantageous to use a virtual time base so as to manage the displaying of the frames with the right polarity.

Module for Managing Buffer Memories (DMA manager) 226

Figure 7:
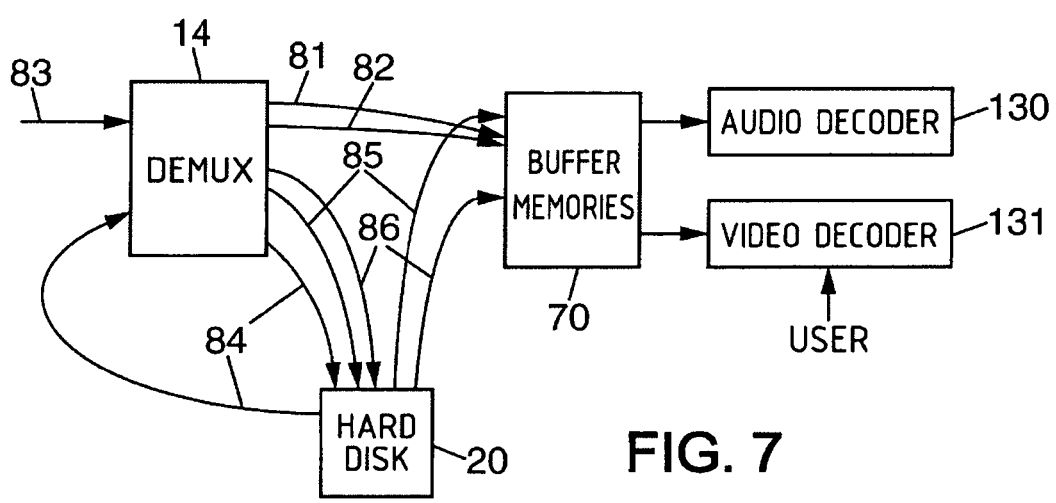
FIG. 7 is a diagram which illustrates the principle of the decoding of a stream of audio packets and of a stream of video packets according to a preferred embodiment of the present invention.

The principle of the management of the elementary stream buffer memories which performs the prebuffering of the audio data packets and of the video data packets in a preferred embodiment is illustrated by the diagram of FIG. 7.

There is provided a set of buffer memories 70. These buffer memories are adapted for storing portions of an audio data stream, or portions of a video data stream. This is why they are also called elementary stream buffer memories. It will be noted that the data stored in these buffer memories are coded data, that is to say data compressed according to a compression standard such as the MPEG standard. Their size is sufficient to make it possible to store a sufficient portion of stream for decoding. For those intended for storing portions of the video data stream, in particular, the size is sufficient to store at least one group of pictures (GOP) within the meaning of the MPEG standard. Preferably, the user chooses the number of them that are allotted, for example in the system memory 30. The number of these buffer memories is however advantageously limited to a maximum number, for example 12 (this number depending on the memory resources available).

One or more audio data streams and one or more video data streams, corresponding respectively to one or more given audiovisual programs, are obtained from one or more respective sources. These streams are preferably packetized elementary streams (PES) within the meaning of the MPEG standard. The data are typically plaintext data (that is descrambled data).

Thus, represented in FIG. 7 is a stream of audio data packets 81 and a stream of video data packets 82 which are obtained from a demultiplexer corresponding to the transport block 14 of FIG. 4, and more exactly to one of the PTIs 142, 143 or 144 of this block. For example, the streams 81 and 82 may be obtained by demultiplexing and descrambling a stream 83 of coded data, that is compressed data (for example a transport stream within the meaning of the MPEG standard) previously received by the demultiplexer 14, and transmitted to the decoder box via a given transmission channel (satellite, cable or DVB). As a variant, they may be obtained by demultiplexing and descrambling a transport stream 84 received by the demultiplexer 14, which is comparable to the transport stream 83 but which is read from the hard disk 20. Such a transport stream may have previously been stored on the hard disk 20 after having been transmitted to the decoder box via a given transmission channel (satellite, cable or DVB).

Likewise, also represented are a stream of audio data packets 85 and a stream of video data packets 86 which are obtained from the hard disk 20 (or any other mass storage digital medium). For example, these streams 85 and 86 are read directly from the hard disk. In this case, they have for example previously been stored on the hard disk, in particular in the form of a packetized elementary stream (PES) within the meaning of the MPEG standard, after having been produced by the demultiplexer 14 from a transport stream such as the aforesaid stream 83.

In all cases, portions of the stream of audio data packets and portions of the stream of video data packets are loaded into a set of buffer memories 70. The fact that we are dealing with portions of packetized streams signifies that no information is available a priori regarding the location of the audio frames and of the video frames (pictures) in the buffer memories. It will be seen later that a step of analysis of the stream portions thus buffered makes it possible to obtain this information. The fact that the buffered data are compressed but plaintext data is not really a drawback with regard to the prevention of the pirating of the programs, insofar as the buffering takes place at a juncture very close to the decoding.

Advantageously, the loading of the buffer memories 70 can be carried out by the management module 226 (DMA manager), according to the Pull mode. In this way, the risk of overflow of capacity of the buffer memories is avoided.

Next, audio data and video data are supplied from the buffer memories as input to the audio decoder 130 and to the video decoder 131, respectively. Advantageously, this supply is controlled by the DMA manager 226, according to the Push mode. Nevertheless, no risk of overflow of capacity of the FIFOs 135 (or CD_UNITs) of the decoders results from this, since it will be seen later that it is precisely the decoders that control this supply. Further, the converse risk of underflow of capacity of the decoders is substantially limited owing to the prebuffering of the packets.

It will be noted that the set of buffer memories 70 can receive compressed data from several sources simultaneously. Such is the case in particular when the demultiplexers (PTI) 142, 143 and/or 144 of the transport block 14 (FIG. 4) deliver several streams of audio data packets and several corresponding streams of video data packets substantially at the same time. Such is also the case when a demultiplexer delivers a stream of audio data packets and a corresponding stream of video data packets, substantially at the same time as another stream of audio data packets and a corresponding stream of video data packets are read from the hard disk 20 via the interface 16.

Moreover, several audio decoders such as the decoder 130, and/or several video decoders such as the decoder 131 may be provided.

The rule applied by the DMA manager 226 is that, at a given instant, an elementary stream buffer memory of the set 70 is associated with at most only one data source and at most one data consumer (audio or video decoder). Stated otherwise, a single path between a source and a decoder passes through a given buffer memory.

Eventually, the video data and the audio data thus supplied are decoded with the aid of the audio decoder 130 and of the video decoder 131, respectively.

Advantageously, when data originate from the hard disk 20, the DMA manager 226 is driven by the video decoder 131.

Stated otherwise, it is the video decoder of the decoder 13 which is master of the video driver circuit 10 in hard disk read mode, that is when the data to be decoded originate from the hard disk 20. Thus, it is the video decoder 131 which defines the general clocking of the video driver circuit 10. To this end, the video decoder 131 uses events corresponding to the pulses of the vertical synchronization signal of the display (i.e. the signal Vsync) to define a virtual time base. It asks the hard disk for the data to be decoded, via the DMA manager 226 which manages the necessary requests for instructing the elementary stream buffer memories through which the data to be decoded travel. The requests available are, for example:

a request to instruct the loading of data into a given buffer memory;

a request to instruct the halting of the loading of data into a given buffer memory;

a request to instruct the delivery of data by a given buffer memory;

a request to instruct the halting of the delivery of data by a given buffer memory; and a request to instruct the halting of the loading of data into a buffer memory and of the supplying of data by this buffer memory, and to instruct the reinitialization of the pointers of this buffer memory.

Combinations of these five requests make it possible to manage all situations, so as to obtain data from the demultiplexer (or from one of the demultiplexers) or directly from the hard disk, and to deliver them to the decoder (or to one of the decoders) for decoding.

It will be noted that a suitable synchronization mechanism allows the audio processing procedure to synchronize itself with the video processing procedure.

The real time base corresponds to a period of the signal Vsync per displayed frame (image). The virtual time base introduced is defined by the following parameter: "number of past images per period of the signal Vsync", this making it possible to manage in particular the various reading speeds. Within the meaning of this definition, the expression "past image" means an image which has been displayed or skipped.

For example, if the reading speed is the nominal speed (speed ×1), the "number of past images per period of the signal Vsync" is equal to 1. This means that the number of periods of the virtual clock is equal to the number of periods of the signal Vsync. The virtual clock then aligns itself with the real clock. If the reading speed corresponds to a displaying of one image out of N (speed ×N) where N is a given integer, then this means that N images have passed with each period of the signal Vsync, or else that N periods of the virtual clock signal have occurred during a period of the signal Vsync.

Thus, during an image freeze command, or a command to go forward/back one image or a skip or a loss of video synchronization, the operation consists in setting the "number of past images per period of the signal Vsync" parameter to zero in the first case, and in incrementing/decrementing it by one unit in the other cases.

With each arrival of a pulse of the signal Vsync (that is with each vertical synchronization event of the display, also denoted Vsync in the literature) corresponding to the virtual timebase, the decoder 13 checks the state of the buffer memories 70. If they are empty, it asks the pipeline manager 210 to supply data to the buffer memories 70. The pipeline manager 210 then instructs an access to the hard disk 20 so that it supplies data to the demultiplexer 14, which then supplies them to the decoder 13 via the buffer memories 70, the whole being clocked.

The speed of presentation of the frames can be managed by the display module 234 with the aid of a parameter having the form of a fraction of the type M/Q where M designates the number of images and Q the number of vertical synchronization events of the display (i.e. the number of pulses of the signal Vsync). Preferably, the fraction M/Q is reduced, that is the numbers M and Q are relatively prime. This speed is controlled by the user. The read commands that he enters for this purpose act directly on the video decoder 131 (see FIG. 7). The commands are, for example, forward read at nominal speed or at high speed, image freeze, rewind at high speed or otherwise, image-by-image display, etc.

Preferably, the buffer memories 70 are managed in a linear manner, in particular a circular manner. However, when the user enters a rewind command (with a view to displaying the images backwards), the buffer memories 70 are no longer linear. Indeed, in this case the decoder latches on to a specified elementary stream buffer memory and can randomly access the data which the latter contains.

In one advantageous embodiment, each buffer memory 70 comprises a first and a second memory bank. An analysis of a first portion of the data stream, which portion is stored in the first memory bank of a given buffer memory, can thus be carried out at the same time as the decoding of the audio frames or of the video frames, respectively, contained in a second portion of the same data stream, which portion is stored in the second memory bank of the buffer memory.

This analysis is performed by the header search module 231 described above. It consists in identifying a Random Access Point (or RAP) of a decodable group of frames and of determining at least for each of the frames of the group, information including the address of the frame in the buffer memory, a presentation time stamp (PTS) associated with an order of presentation of the frame in the forward direction. In the case of a video frame coded according to the MPEG standard, this information further comprises the type I, P or B of the image.

The present invention can be implemented in hardware, software, or a combination of hardware and software. Any processor, controller, or other apparatus adapted for carrying out the functionality described herein is suitable. A typical combination of hardware and software could include a general purpose microprocessor (or controller) with a computer program that, when loaded and executed, carries out the functionality described herein.

The present invention can also be embedded in a computer program product, which comprises all the features enabling the implementation of the methods described herein, and which—when loaded in an information processing system— is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for decoding one or more audio data streams and one or more video data streams obtained from one or more sources of data coded according to a data compression standard, the method comprising the steps of:
    loading portions of the audio data stream and portions of the video data stream into a set of buffer memories;
    supplying, from the buffer memories, audio data and video data at the input of at least one audio decoder and at least one video decoder, respectively;
    decoding the video data and the audio data with the aid of the audio decoder and of the video decoder, respectively, and
    using the video decoder to regulate a management module,
    wherein the loading step is carried out by a management module according to the Pull mode and/or the supplying step is carried out by the management module according to the Push mode.

2. The method of claim 1, wherein the audio data stream and the video data stream are obtained by reading from a mass storage digital medium.

3. The method of claim 1, wherein the audio data stream and the video data stream are obtained by reading from a mass storage digital medium and demultiplexing a transport stream within the meaning of the MPEG standard.

4. The method of claim 1, wherein the audio data stream and the video data stream are obtained by demultiplexing a transport stream within the meaning of the MPEG standard, the transport stream being received in real time via a given transmission channel.

5. The method of claim 1, wherein the portions of the audio data stream and the portions of the video data stream which are loaded into the buffer memories are portions of packetized data streams.

6. The method of claim 1, wherein the portions of the audio data stream and the portions of the video data stream which are loaded into the buffer memories are portions of plaintext data streams.

7. The method of claim 1, wherein in the using step, the video decoder regulates the management module in synchronism with pulses of a signal for vertical synchronization of the displaying of the images.

8. The method of claim 1, wherein the buffer memories are managed in a linear manner, except for a decoding with a view to a display of the images in rewind mode.

9. The method of claim 1,
    wherein each buffer memory comprises a first and a second memory bank, and the method comprises:
        analysis of a first portion of the audio data stream or of the video data stream, which portion is stored in the first memory bank of a specified buffer memory; and
        decoding audio frames or video frames, respectively, which are contained in a second portion of the audio data stream or of the stream of video data packets, respectively, which portion is stored in the second memory bank of the buffer memory.

10. The method of claim 1, wherein the loading step is carried out by the management module according to Pull mode and the supplying step is carried out by the management module according to the Push mode.

11. A device for decoding one or more audio data streams and one or more video data streams obtained from one or more sources of data coded according to a data compression standard, the device comprising:
    a set of buffer memories;
    at least one source of audio data and at least one source of video data;
    at least one audio decoder and at least one video decoder; and
    a management module for loading the data from the source into the buffer memories according to the Pull mode and/or for supplying the data to the audio decoder and to the video decoder according to the Push mode,
    wherein the management module is regulated by the video decoder.

12. The device of claim 11, further comprising means for obtaining the audio data stream and the video data stream by reading from a mass storage digital medium.

13. The device of claim 11, further comprising means for obtaining the audio data stream and the video data stream by reading from a mass storage digital medium and demultiplexing a transport stream within the meaning of the MPEG standard.

14. The device of claim 11, further comprising:
    means for obtaining the audio data stream and the video data stream by demultiplexing a transport stream within the meaning of the MPEG standard; and
    means for receiving the transport stream in real time via a specified transmission channel.

15. The device of claim 11, wherein the portions of the audio data stream and the portions of the video data stream which are loaded into the buffer memories are portions of packetized data streams.

16. The device of claim 11, wherein the portions of the audio data stream and the portions of the video data stream which are loaded into the buffer memories are portions of plaintext data streams.

17. The device of claim 11, wherein the management module is regulated by the video decoder in synchronism with pulses of a signal for vertical synchronization of the displaying of the images.

18. The device of claim 11, wherein the buffer memories are managed in a linear manner, except for a decoding with a view to a display of the images in rewind mode.

19. The device of claim 11,
    wherein each buffer memory comprises a first and a second memory bank, and the device further comprises:
        means for analyzing a first portion of the audio data stream or of the video data stream, which portion is stored in the first memory bank of a given buffer memory; and
        means for decoding audio frames or video frames, respectively, which are contained in a second portion of the audio data stream or of the stream of video data packets, respectively, which portion is stored in the second memory bank of the buffer memory.

20. A video driver circuit comprising a device according to claim 11.

21. A decoder box comprising a video driver circuit according to claim 20.

22. A tangible computer-readable storage medium encoded with a program for decoding one or more audio data streams and one or more video data streams obtained from one or more sources of data coded according to a data compression standard, said program containing instructions for performing the steps of: loading portions of the audio data stream and portions of the video data stream into a set of buffer memories; supplying, from the buffer memories, audio data and video data at the input of at least one audio decoder and at least one video decoder, respectively; and decoding the video data and the audio data with the aid of the audio decoder and of the video decoder, respectively, and using the video decoder to regulate a management module, wherein the loading step is carried out by a management module according to the Pull mode and/or the supplying step is carried out by the management module according to the Push mode, the tangible computer-readable medium is a tangible medium, the tangible medium being at least one of non-volatile memory and volatile storage, and the tangible computer-readable medium is not an intangible medium.

23. The tangible computer-readable storage medium of claim 22, wherein the audio data stream and the video data stream are obtained by reading from a mass storage digital medium.

24. The tangible computer-readable storage medium of claim 22, wherein the audio data stream and the video data stream are obtained by reading from a mass storage digital medium and demultiplexing a transport stream within the meaning of the MPGE standard.

* * * * *